United States Patent
Ozaki et al.

(10) Patent No.: US 9,856,996 B2
(45) Date of Patent: Jan. 2, 2018

(54) EXHAUST GAS TREATMENT UNIT

(71) Applicant: KOMATSU LTD., Tokyo (JP)

(72) Inventors: Taira Ozaki, Ikoma (JP); Hiroshi Nakagami, Hirakata (JP); Hironori Yamamitsu, Hirakata (JP); Kanji Namimatsu, Oyama (JP); Hiroshi Ohta, Sano (JP); Kenji Matsubara, Oyama (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/112,122

(22) PCT Filed: Mar. 29, 2013

(86) PCT No.: PCT/JP2013/059620
§ 371 (c)(1),
(2) Date: Oct. 16, 2013

(87) PCT Pub. No.: WO2014/155704
PCT Pub. Date: Oct. 2, 2014

(65) Prior Publication Data
US 2014/0290781 A1  Oct. 2, 2014

(51) Int. Cl.
*F01N 3/10* (2006.01)
*F16L 3/08* (2006.01)
(Continued)

(52) U.S. Cl.
CPC ............ *F16L 3/08* (2013.01); *E02F 9/0866* (2013.01); *F01N 13/009* (2014.06);
(Continued)

(58) Field of Classification Search
CPC ............ F01N 13/009; F01N 13/1805; F01N 13/1816; F01N 13/1822; F01N 2590/08;
(Continued)

(56) References Cited

U.S. PATENT DOCUMENTS 8,631,895 B2 * 1/2014 Tanaka et al. ................ 180/309
8,695,748 B2 * 4/2014 Togo et al. .................... 180/309
(Continued)

FOREIGN PATENT DOCUMENTS

JP    2007-285141 A    11/2007
JP    2010-71176 A     4/2010
(Continued)

OTHER PUBLICATIONS

International Search Report for PCT/JP2013/059620, dated Jun. 18, 2013.

*Primary Examiner* — Phutthiwat Wongwian
*Assistant Examiner* — Diem Tran
(74) *Attorney, Agent, or Firm* — Global IP Counselors, LLP

(57) ABSTRACT

An exhaust gas treatment unit includes an exhaust gas treatment device, a bracket and a connecting pipe. The exhaust gas treatment device is mounted on a bracket. The connecting pipe is connected to the exhaust gas treatment device. The connecting pipe directs exhaust gas to the exhaust gas treatment device. The connecting pipe may include a supporting portion and a pipe portion, with the supporting portion supporting the bracket and the pipe portion being integrated with the supporting portion. Alternatively, the exhaust gas treatment unit may further include a supporting member having a supporting portion supporting the bracket and a pipe portion integrated with the supporting portion, with the pipe portion connected to the connecting pipe.

16 Claims, 10 Drawing Sheets

(51) Int. Cl.
  *E02F 9/08* (2006.01)
  *F01N 13/18* (2010.01)
  *F01N 13/00* (2010.01)
  *B60K 13/04* (2006.01)
  *F01N 3/20* (2006.01)
  *F01N 3/021* (2006.01)

(52) U.S. Cl.
  CPC ..... *F01N 13/1805* (2013.01); *F01N 13/1816* (2013.01); *F01N 13/1822* (2013.01); *B60K 13/04* (2013.01); *B60Y 2200/411* (2013.01); *F01N 3/021* (2013.01); *F01N 3/2066* (2013.01); *F01N 2590/08* (2013.01)

(58) Field of Classification Search
  CPC ....... F01N 3/021; F01N 3/2066; B60K 13/04; B60Y 2200/411
  USPC ................... 60/272, 299, 322, 323
  See application file for complete search history.

(56) References Cited

U.S. PATENT DOCUMENTS

| | | | |
|---|---|---|---|
| 8,887,493 B2 * | 11/2014 | Shin ........................... | 60/299 |
| 8,904,766 B2 * | 12/2014 | Saito et al. ................. | 60/299 |
| 2012/0247861 A1 | 10/2012 | Mizuno et al. | |

FOREIGN PATENT DOCUMENTS

| | | |
|---|---|---|
| JP | 2012-136845 A | 7/2012 |
| JP | 2012-215022 A | 11/2012 |
| WO | 2011/152306 A1 | 12/2011 |

* cited by examiner

EXHAUST GAS TREATMENT UNIT

CROSS-REFERENCE TO RELATED APPLICATIONS

This application is a U.S. National stage application of International Application No. PCT/JP2013/059620, filed on Mar. 29, 2013.

BACKGROUND

Field of the Invention

The present invention relates to an exhaust gas treatment unit.

Background Information

In recent years intensive exhaust gas treatment devices are being connected to engines in order to protect the environment. An exhaust gas treatment device is a device that purifies exhaust gas from an engine. An exhaust gas treatment device may be for example, a device that lowers the level of nitrogen oxide (NOx), a device that lowers the level of carbon monoxide (CO) or a device that removes particulate matter.

An exhaust gas treatment device is connected to an engine via a connecting pipe. In the engine apparatus disclosed in Japan Patent Laid-open Patent Publication JP-A-2010-71176 for example, an exhaust gas treatment device is arranged above the engine. The exhaust gas treatment device is supported by the engine via a bracket. The exhaust gas treatment device is connected to the engine via a connecting pipe.

SUMMARY

When the route of a connecting pipe is complex substantial space is required in order to arrange the connecting pipe. In this case, the problem arises that there are restrictions on the arrangement of other equipment in order to avoid interference between the connecting pipe and the other equipment. Again, there is the problem of having only a narrow space in order to arrange other equipment. For this reason, it is preferable that the route of a connecting pipe be simplex.

On the one hand, as an exhaust gas treatment device is of heavy weight it is preferable that the device is firmly supported by a bracket. The bracket, provided to support the exhaust gas treatment device, is arranged around the exhaust gas treatment device. Further, as the connecting pipe is connected to the exhaust gas treatment device, the connecting pipe also is arranged around the exhaust gas treatment device. Accordingly, the problem arises that in order to avoid interference between the connecting pipe and the bracket the route of the connecting pipe becomes complex.

An object of the present invention is to provide an exhaust gas treatment unit in which an exhaust gas treatment device can be strongly supported and in which the route of a connecting pipe can be simplified.

An exhaust gas treatment unit according to a first aspect of the invention herein disclosed, provides an exhaust gas treatment device, a bracket and a connecting pipe. The exhaust gas treatment device is mounted on the bracket. The connecting pipe is connected to the exhaust gas treatment device. The connecting pipe directs exhaust gas to the exhaust gas treatment device. The connecting pipe includes a supporting portion and a pipe portion. The supporting portion supports the bracket. The pipe portion is integrated with the supporting portion.

In the exhaust gas treatment unit the exhaust gas treatment device can be firmly supported by the supporting portion. Further, the connecting pipe includes a supporting portion. That is to say, the connecting pipe is also used as a part for supporting the exhaust gas treatment device. For this reason the route of the connecting pipe can be simplified. Further, as the pipe portion is integrated with the supporting portion, the number of components can be reduced.

It is suitable for the pipe portion to be formed passing through the supporting portion. In this configuration the route of the connecting pipe can be further simplified. Further the pipe portion and the supporting portion can be compactly arranged.

It is suitable for the supporting portion to include an upper supporting portion extending upward from the pipe portion. In this configuration the exhaust gas treatment device can be supported by the upper supporting portion and the pipe portion.

It is suitable for the supporting portion to include a lower supporting portion extending downward from the pipe portion. In this configuration the exhaust gas treatment device can be supported by the lower supporting portion and the pipe portion.

It is suitable for the supporting portion and the pipe portion to be positioned below the bracket. In this arrangement, the bracket can be supported from below by the supporting portion and the pipe portion.

It is suitable for the connecting pipe to have a first end portion and a second end portion. The first end portion is connected to the exhaust gas treatment device. The second end portion is the end portion on the opposite side to the first end portion. It is suitable that the first end portion and the second end portion be positioned in the same perpendicular plane. In this configuration, the length of the route of the connecting pipe can be shortened.

It is suitable for the bracket to be rectangular. It is suitable for the supporting portion to support a corner of the bracket. In this configuration the connecting pipe can be arranged so as to pass below the corner of the bracket, and the route of the connecting pipe can be simplified.

It is suitable for the connecting pipe to further provide a bellows portion. The bellows portion is arranged between the pipe portion and the exhaust gas treatment device. The bellows portion is expandable-contractible. In this configuration, adjustment of the position of the pipe portion and the supporting portion in relation to the exhaust gas treatment device can be performed easily. Accordingly, it becomes easy to connect the connecting pipe to the exhaust gas treatment device.

An exhaust gas treatment unit according to a second aspect of the invention herein disclosed, provides a bracket, a supporting member, and a connecting pipe. The exhaust gas treatment device is mounted on the bracket. The supporting member supports the bracket. The connecting pipe is connected to the exhaust gas treatment device. The connecting pipe directs exhaust gas to the exhaust gas treatment device. The supporting member includes a supporting portion and a pipe portion. The supporting portion supports the bracket. The pipe portion is integrated with the supporting portion. The pipe portion is connected to the connecting pipe.

In the exhaust gas treatment unit the exhaust gas treatment device can be firmly supported by the supporting portion. Further, the supporting member includes a pipe portion. That is to say, the supporting member is also used as a part for directing exhaust gas. For this reason the route of the connecting pipe can be simplified. Further, as the pipe portion is integrated with the supporting portion, the number of components can be reduced.

It is suitable for the pipe portion to be formed passing through the supporting portion. In this configuration the route of the connecting pipe can be further simplified. Further the pipe portion can be compactly arranged with the supporting portion.

It is suitable for the supporting portion to include an upper supporting portion extending upward from the pipe portion. In this configuration the exhaust gas treatment device can be supported by the upper supporting portion and the pipe portion.

It is suitable for the supporting portion to include a lower supporting portion extending downward from the pipe portion. In this configuration the exhaust gas treatment device can be supported by the lower supporting portion and the pipe portion.

It is suitable for the supporting portion and the pipe portion to be positioned below the bracket. In this arrangement, the bracket can be supported from below by the supporting portion and the pipe portion.

It is suitable for the connecting pipe to have a first end portion. The first end portion is connected to the exhaust gas treatment device. It is suitable for the connecting pipe to have a second end portion. The second end portion is positioned on the opposite side to the connecting portion of the connecting pipe. It is suitable for the first end portion and the second end portion to be positioned in the same perpendicular plane. In this configuration, the length of the route of the connecting pipe can be shortened.

It is suitable for the bracket to be rectangular. It is suitable for the supporting portion to support a corner of the bracket. In this configuration the connecting pipe can be arranged so as to pass below the corner of the bracket, and the route of the connecting pipe can be simplified.

It is suitable for the connecting pipe to further provide a bellows portion. The bellows portion is arranged between the pipe portion and the exhaust gas treatment device. The bellows portion is expandable-contractible. In this configuration, adjustment of the position of the pipe portion and the supporting portion in relation to the exhaust gas treatment device can be performed easily. Accordingly, it becomes easy to connect the connecting pipe to the exhaust gas treatment device.

A working vehicle according to a third aspect of the invention herein disclosed, provides the above described exhaust gas treatment unit.

An exhaust gas treatment unit related to the invention herein disclosed enables an exhaust gas treatment device to be firmly supported and enables the route of a connecting pipe to be simplified.

DESCRIPTION OF EMBODIMENTS

Figure 1:
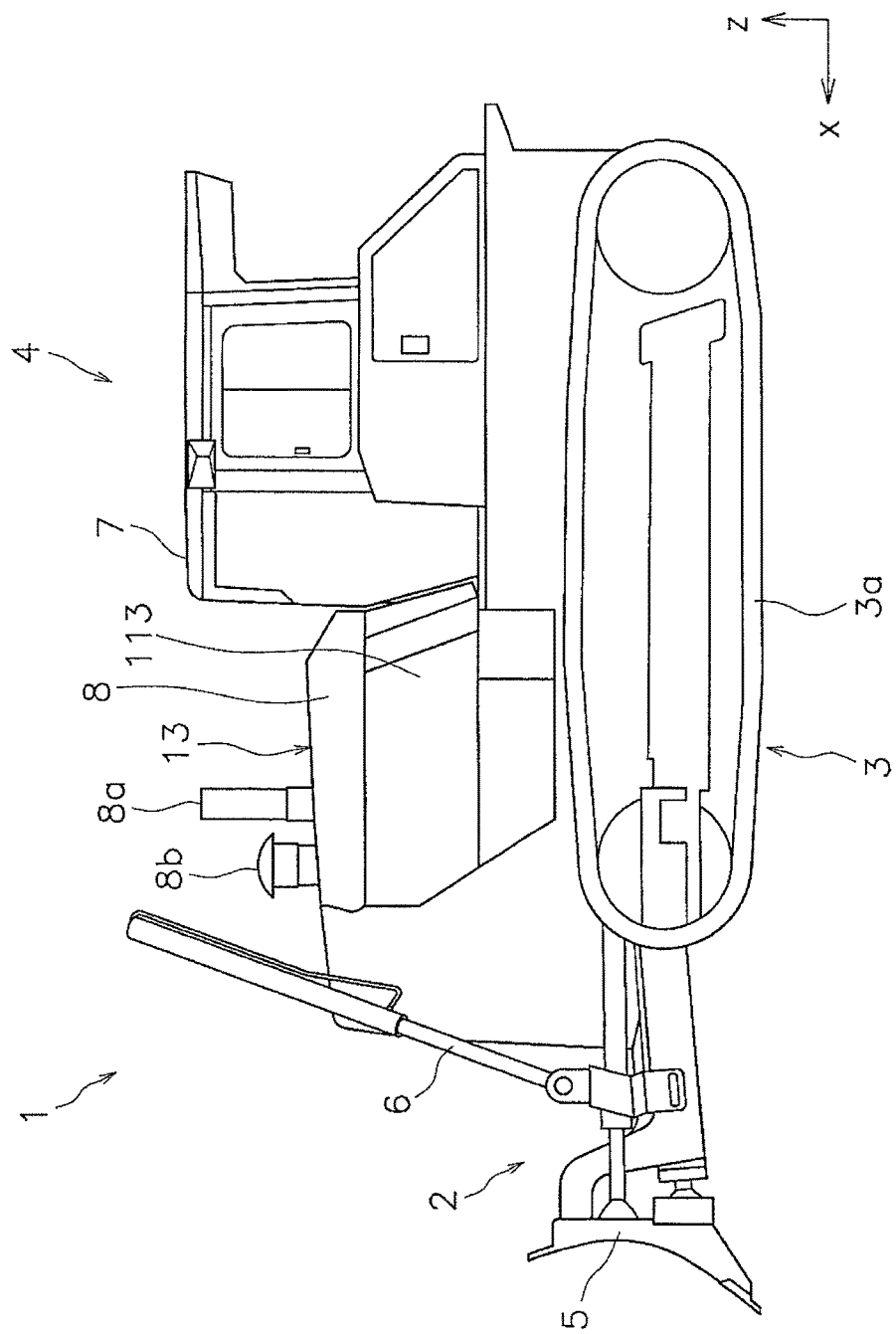
FIG. 1 is a left side view of a working vehicle related to an embodiment of the present invention.

A working vehicle related to an embodiment of the present invention will now be described with reference to the drawings. FIG. 1 is a left side view of a working vehicle 1 related to an embodiment of the present invention. The working vehicle 1 is a bulldozer. The working vehicle 1 provides a working implement 2, a traveling device, 3 and a vehicle body 4. The traveling device 3 is a device that causes the vehicle to travel, and has a crawler track 3a. As the crawler track 3a is driven, the working vehicle 1 travels.

The vehicle body 4 includes a cab 7 and an engine room 8. The cab 7 is arranged adjacent to the engine room 8. The engine room 8 is arranged forward of the cab 7. In this aspect of the present invention, forward and rear, left and right refer to how each of these is seen from the point of view of an operator in the cab 7. In the drawings, the forward and rearward directions are indicated on the x axis, the left and right directions are indicated on the y axis, and the upward and downward directions are indicated on the z axis.

The working implement 2 is provided forward of the engine room 8. The working implement 2 has a blade 5 and a hydraulic cylinder 6. The blade 5 is provided such that it is able to move in the upward-downward direction. The hydraulic cylinder 6 changes the posture of the blade 5.

Figure 2:
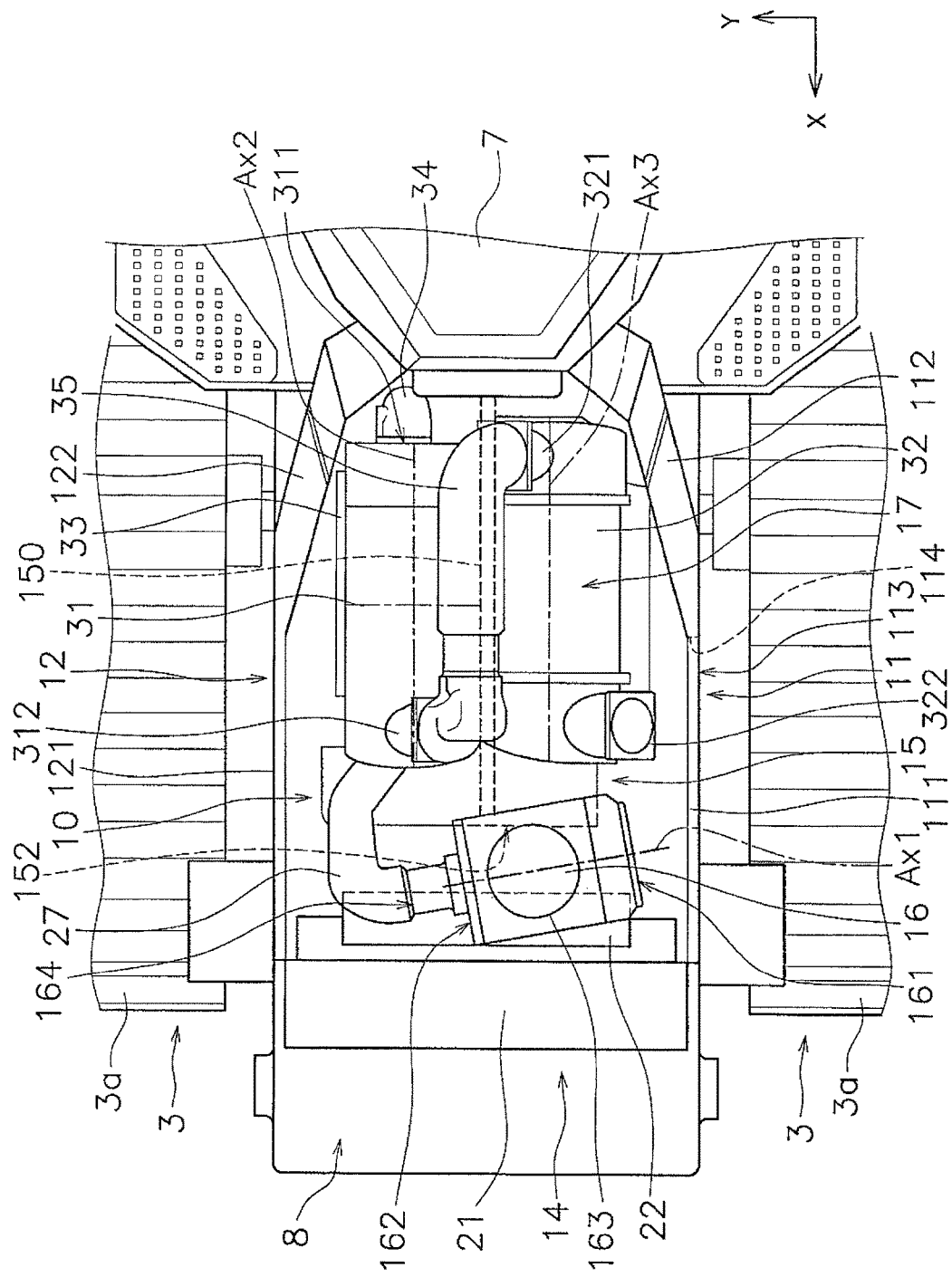
FIG. 2 is a plan view showing the configuration within the engine room of the working vehicle.
Figure 3:
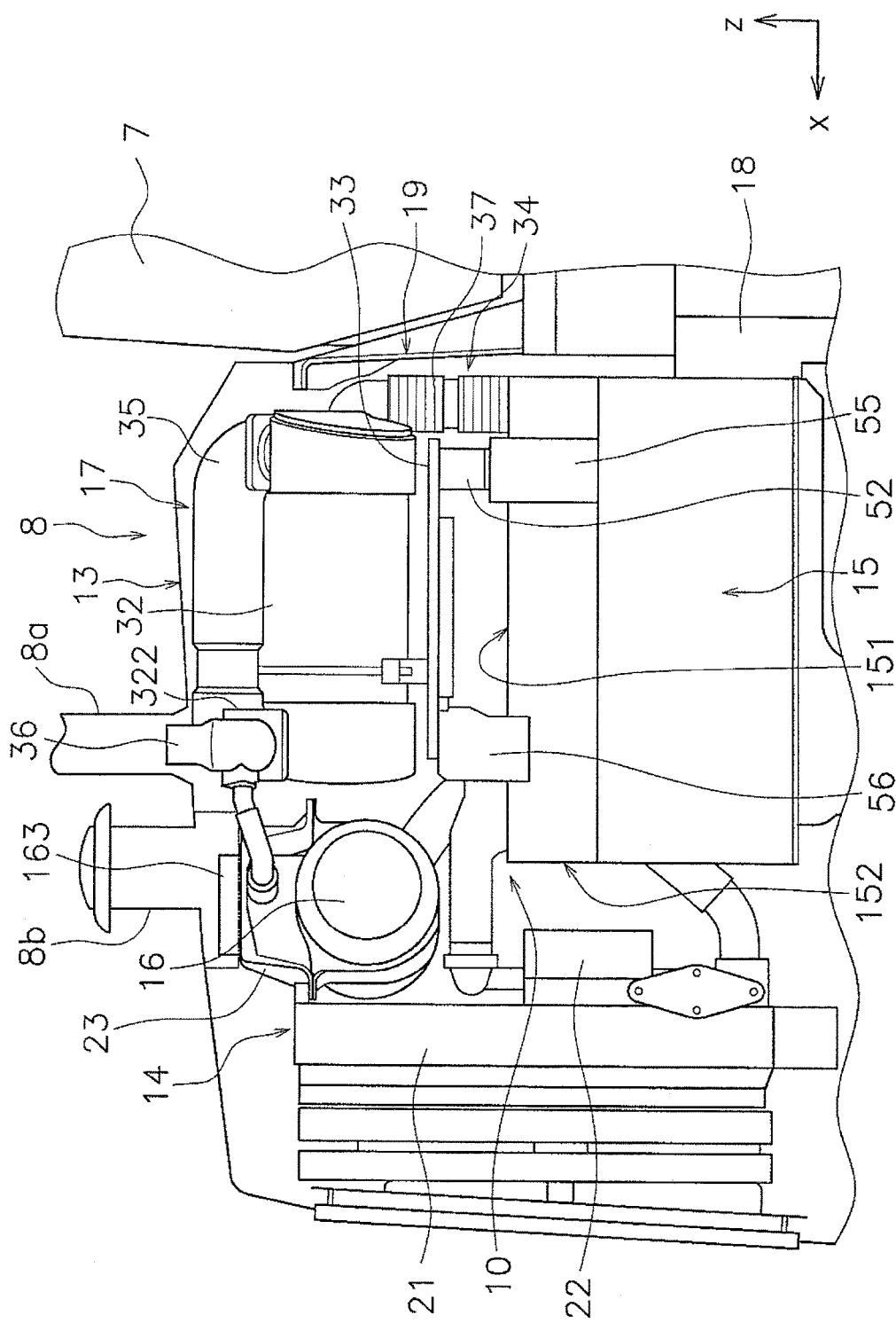
FIG. 3 is a left side view showing the configuration within the engine room.

FIG. 2 is a plan view showing the configuration within the engine room 8. FIG. 3 is a left side view showing the configuration within the engine room 8. Note that to facilitate ease of understanding, in FIG. 2 and FIG. 3 part of the configuration within the engine room 8 is omitted.

As shown in FIG. 2, the engine room 8 has a first side face 11 and a second side face 12. In this embodiment of the present invention, the first side face 11 is the left side face of the engine room 8. The second side face 12 is the right side face of the engine room 8. The first side face 11 has a first planar section 111 and a first inclined section 112. In the planar view of the vehicle, the first planar section 111 is disposed extending in the forward-backward direction. The first inclined section 112 is arranged behind the planar section 111.

The second side face 12 has a second planar section 121 and a second inclined section 122. In the planar view of the vehicle, the second planar section 121 is arranged extending in the forward-backward direction. The second inclined section 122 is arranged behind the second planar section 121. In the planar view of the vehicle the first inclined section 112 and the second inclined section 122 are arranged at an inclination such that the gap between them decreases in the rearward direction.

As shown in FIG. 3, the engine room 8 has an upper face 13. The upper face 13 of the engine room 8 inclines downward in the forward direction. An exhaust gas outlet pipe 8a described subsequently, juts out upward from the upper face 13 of the engine room 8. Further, a head portion 8b described subsequently, juts out upward from the upper face 13 of the engine room 8.

As shown in FIG. 2 and FIG. 3, the working implement 1 has an engine unit 10, a cooling unit 14, and an air cleaner 16. The engine unit 10, the cooling unit 14, and the air cleaner 16 are disposed in the engine room 8.

The engine unit 10 has an engine 15 and an exhaust gas treatment unit 17. The engine 15 is for example a diesel engine. As shown in FIG. 2, the engine 15 has a crankshaft 150. The crankshaft 150 extends in the forward-backward direction of the vehicle. The engine 15 is what is known as a vertical arrangement engine. That is to say, the longitudinal direction of the engine is arranged following the forward-backward direction of the vehicle, and the short direction of the engine is arranged along the widthwise direction of the vehicle.

A flywheel housing 18 is arranged behind the engine 15. A hydraulic pump (not shown in the drawing) is positioned behind the flywheel housing 18. The hydraulic pump is linked to the output shaft of the engine 15 via the flywheel housing 18. The hydraulic pump ejects hydraulic fluid in order to drive the hydraulic cylinder 6.

The cooling unit 14 is arranged forward of the engine 15. The cooling unit 14 includes a radiator 21, and a cooling device 22. The radiator 21 cools the liquid coolant of the engine 15. In this embodiment of the present invention, the cooling device 22 is an oil cooler. The cooling device 22 cools the hydraulic fluid. The radiator 21 is arranged forward of the engine 15. As shown in FIG. 3, the top portion of the radiator 21 is positioned above an upper face 151 of the engine 15. The cooling device 22 is positioned behind the radiator 21. The top portion of the cooling device 22 is positioned below the top portion of the radiator 21.

The air cleaner 16 is arranged between the radiator 21 and the exhaust gas treatment unit 17 in the forward-backward direction of the vehicle. Part of the air cleaner 16 is positioned forward the forward end portion 152 of the engine 15. Specifically, the forward end portion of the air cleaner 16 is positioned forward the engine 15. The rear end portion of the air cleaner 16 is positioned over the engine 15. Part of the air cleaner 16 is positioned over the cooling device 22. Specifically, the forward end portion of the air cleaner 16 is positioned over the cooling device 22.

The air cleaner 16 has a cylindrical form. As shown in FIG. 2, the air cleaner 16 is arranged such that the longitudinal direction thereof intersects with the forward-backward direction of the vehicle. That is to say, the center axial line Ax1 of the air cleaner 16 is at an inclination relative to the forward-backward direction of the vehicle. The angle of inclination of the center axial line Ax1 of the air cleaner 16 relative to the widthwise direction of the vehicle may be for example, less than 45°.

The air cleaner 16 has a first side portion 161 and a second side portion 162. In this embodiment of the present invention, the first side portion 161 is the left side portion of the air cleaner 16. The second side portion 162 is the right side portion of the air cleaner 16. The center axial line Ax1 of the air cleaner 16 is inclined forwards from the first side portion 161 toward the second side portion 162.

The air cleaner 16 is secured to the engine room 8. That is to say, the air cleaner 16 is supported by the engine room 8. Basically, the air cleaner 16 is secured to the engine room 8 in a condition of being suspended from the upper face 13 of the engine room 8 by a bracket 23.

The air cleaner 16 has an air intake opening 163 and an exhaust gas discharge opening 164. The air intake opening 163 is provided in the top portion of the air cleaner 16. The air intake opening 163 is connected to the head portion 8b. The exhaust gas discharge opening 164 is provided in the second side portion 162 of the air cleaner 16.

Figure 4:
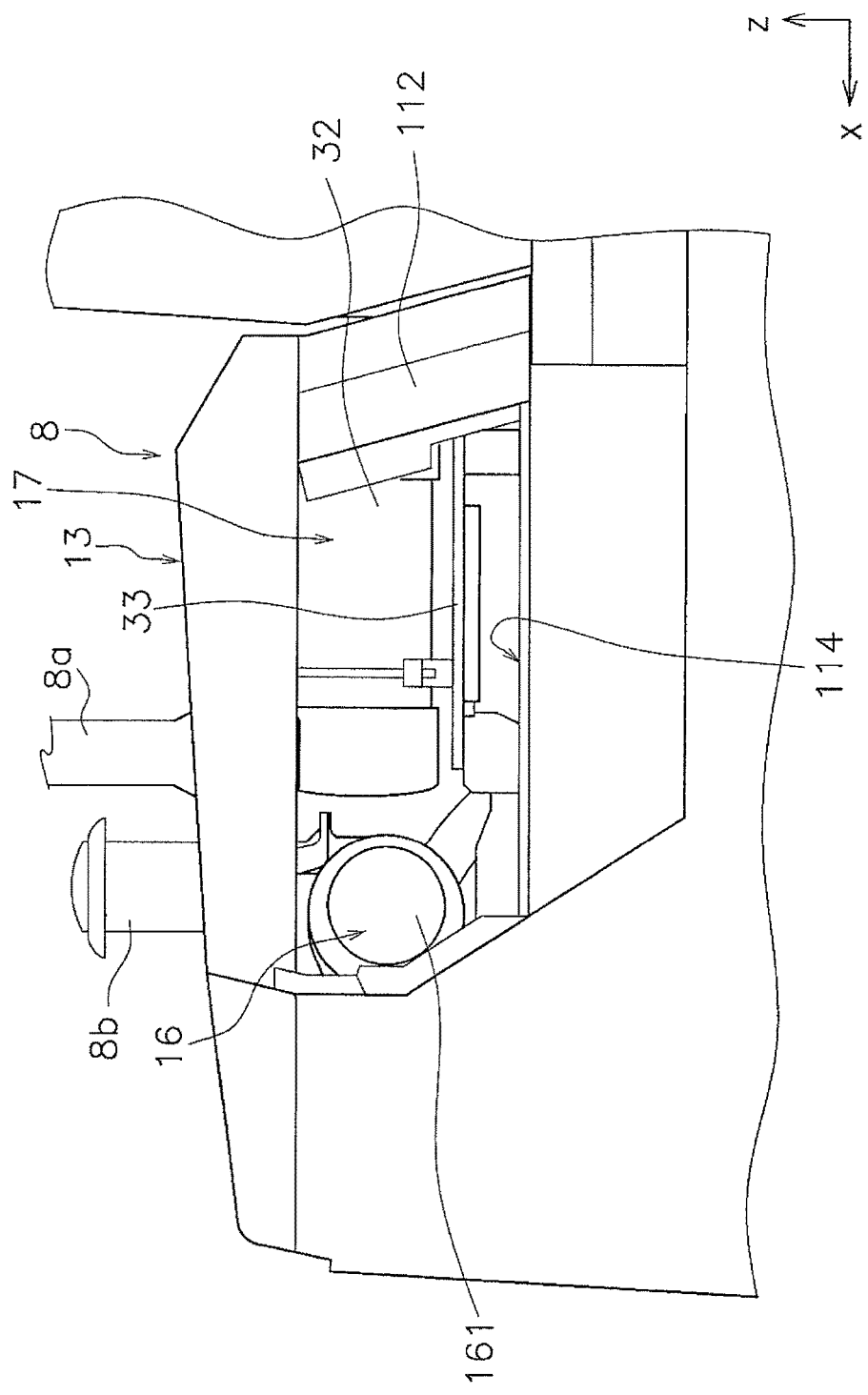
FIG. 4 is a left side view showing the engine room in the condition in which the side panel is detached.

As shown in FIG. 1 the engine room 8 has a side panel 113. FIG. 4 is a left side view showing the engine room 8 in the condition in which the side panel 113 has been detached.

As shown in FIG. 4 the engine room 8 has an opening 114. The side panel 113 and the opening 114 are provided in the planar section 111 described above. The opening 114 is positioned lateral to the air cleaner 16. The side panel 113 is disposed so as to be able to open and close the opening 114. As shown in FIG. 2 the above described first side portion 161 is, in the air cleaner 16, the side face closest to the side panel 113. Further, the second side portion 162 is, in the air cleaner 16, the side face furthest from the side panel 113. Viewed from the side of the vehicle, the first side portion 161 is disposed so as to overlap with the side panel 113. Accordingly, as shown in FIG. 4, viewed from the side of the vehicle, with the side panel 113 in the opened condition, the first side portion 161 is visible through the opening 114. Further, as shown in FIG. 2, the air cleaner 16 is arranged such that the extension line of the center axial line Ax1 of the air cleaner 16 passes through the opening 114.

Figure 5:
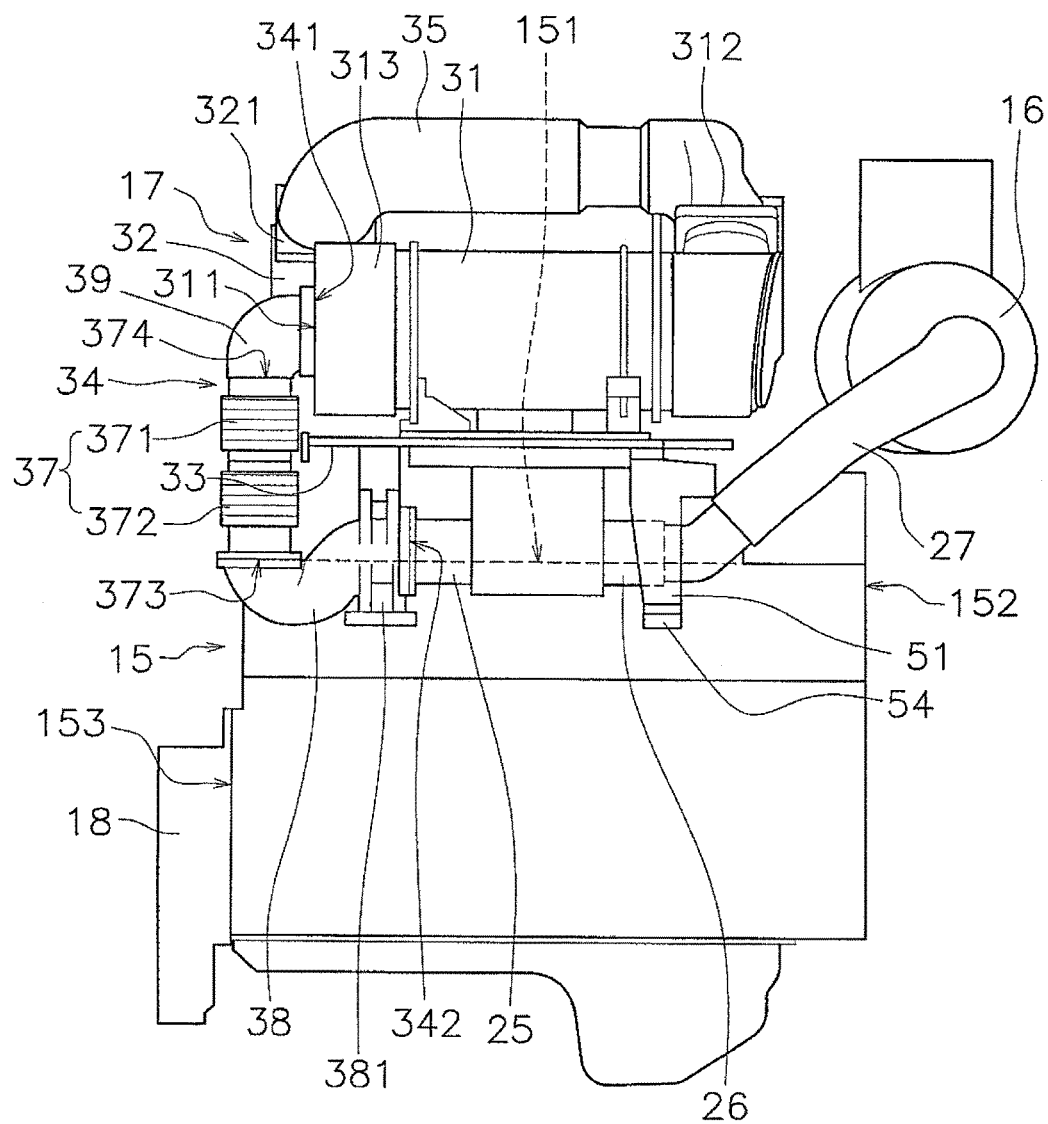
FIG. 5 is a right side view showing the engine and the devices peripheral to the engine.
Figure 6:
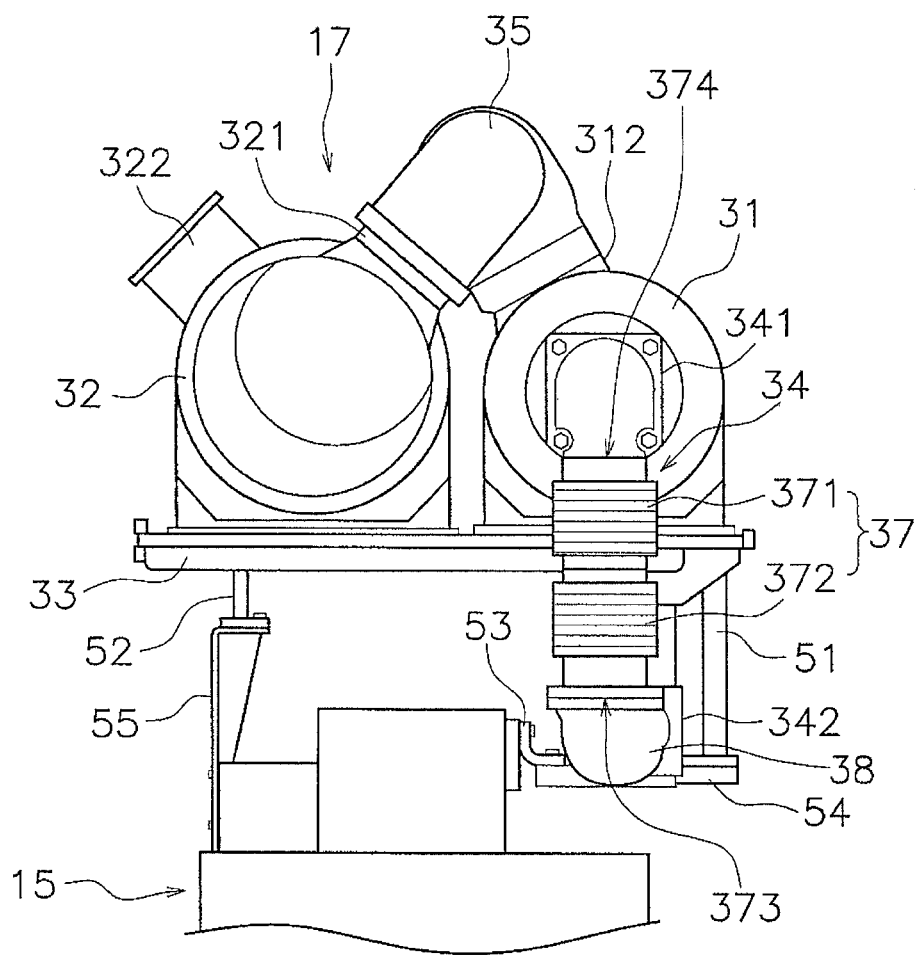
FIG. 6 is a rear view showing the engine and the devices peripheral to the engine.

FIG. 5 is a right side view showing the engine 15 and the devices peripheral to the engine 15. FIG. 6 is a rear view showing the engine 15 and the devices peripheral to the engine 15. As shown in FIG. 5, the engine 15 has an exhaust gas opening 25 and an air suction opening 26. The exhaust gas opening 25 and the air suction opening 26 are provided on the side section of the engine 15. In this embodiment, the exhaust gas opening 25 and the air suction opening 26 are provided on the right side section of the engine 15. The exhaust gas opening 25 is positioned behind the air suction opening 26. The air suction opening 26 is connected to the exhaust gas discharge opening 164 of the air cleaner 16 via a duct 27.

The exhaust gas treatment unit 17 is a device for cleaning exhaust gas from the engine 15. As shown in FIG. 2 and FIG. 6 the exhaust gas treatment unit 17 is positioned above the engine 15. The exhaust gas treatment unit 17 has a first exhaust gas treatment device 31 and a second exhaust gas treatment device 32.

The first exhaust gas treatment device 31 is a device for treating exhaust gas from the engine 15. In this embodiment of the present invention the first exhaust gas treatment device 31 is a diesel particulate collection filter device that collects particulate matter within exhaust gas by a filter. The first exhaust gas treatment device 31 incinerates the collected particulate matter in a heater attached to the filter. The first exhaust gas treatment device 31 is of substantially cylindrical external form. The first exhaust gas treatment device 31 is arranged such that the longitudinal direction thereof follows the forward-backward direction of the vehicle. That is to say, the center axial line Ax2 of the first exhaust gas treatment device 31 is positioned following the forward-backward direction of the vehicle.

The second exhaust gas treatment device 32 is a device for treating exhaust gas from the engine 15. In this embodiment of the present invention the second exhaust gas treatment device 32 is a selective reducing catalytic device that uses ammonia obtained by hydrolysis of aqueous urea for reducing nitrogen oxide NOx. The second exhaust gas treatment device 32 is of substantially cylindrical external form. The second exhaust gas treatment device 32 is arranged such that the longitudinal direction thereof follows the forward-backward direction of the vehicle. That is to say, the center axial line Ax3 of the second exhaust gas treatment device 32 is positioned following the forward-backward direction of the vehicle. The second exhaust gas treatment device 32 is provided lateral to the first exhaust gas treatment device 31. In this embodiment of the present invention, the second exhaust gas treatment device 32 is provided on the left side of the first exhaust gas treatment device 31.

As shown in FIG. 5, the front end portion of the first exhaust gas treatment device 31 is positioned alongside the front end portion 152 of the engine 15. The rear end portion of the first exhaust gas treatment device 31 is positioned forward of the rear end portion 153 of the engine 15. The rear end portion of the first exhaust gas treatment device 31 is positioned between the first inclined section 112 and the second inclined section 122.

As shown in FIG. 2, the front end portion of the second exhaust gas treatment device 32 is positioned behind the front end portion 152 of the engine 15. The front end portion of the second exhaust gas treatment device 32 is positioned behind the front end portion of the first exhaust gas treatment device 31. The rear end portion of the second exhaust gas treatment device 32 is positioned forward the rear end portion 153 of the engine 15. The rear end portion of the second exhaust gas treatment device 32 is positioned behind the rear end portion of the first exhaust gas treatment device 31. The rear end portion of the second exhaust gas treatment device 32 is positioned between the first inclined section 112 and the second inclined section 122.

As shown in FIG. 3, FIG. 5 and FIG. 6, the exhaust gas treatment unit 17 has a bracket 33. The first exhaust gas treatment device 31 and the second exhaust gas treatment device 32 are arranged above the bracket 33. The first exhaust gas treatment device 31 and the second exhaust gas treatment device 32 are secured to the bracket 33 by fixing means such as a U bolt or the like. In this way, the first exhaust gas treatment device 31, the second exhaust gas treatment device 32 and the bracket 33 are integrated. The bracket 33 is attached to the engine 15 via a supporting member described subsequently, thus the exhaust gas treatment unit 17 is supported by the engine 15.

The engine unit 10 provides a first connecting pipe 34. The first connecting pipe 34 links the exhaust gas opening 25 of the engine 15 and the first exhaust gas treatment device 31. The first connecting pipe 34 is connected to the exhaust gas opening 25 of the engine 15. As shown in FIG. 5, the first connecting pipe 34 has a first end portion 341 and a second end portion 342. The first end portion 341 is connected to the first exhaust gas treatment device 31. The second end portion 342 is the end portion on the opposite end to the first end portion 341. The second end portion 342 is connected to the exhaust gas opening 25. As shown in FIG. 6, the first end portion 341 and the second end portion 342 are positioned in the same perpendicular plane extending in the forward-backward direction of the vehicle. The first connecting pipe 34 comes to be positioned in that same perpendicular plane.

The rear end portion of the first connecting pipe 34 is positioned behind the rear end portion of the second exhaust gas treatment device 32. As shown in FIG. 3, the cab 7 is provided behind the first connecting pipe 34. Viewed from the side of the vehicle, a wall part 19 is arranged between the first connecting pipe 34 and the cab 7. That is to say, the wall part 19 is arranged between the cab 7 and the engine 15. The wall part 19 is the rear face of the engine room 8. The first connecting pipe 34 is arranged close to the wall part 19 of the engine room 8. Specifically, the distance between the wall part 19 of the engine room 8 and the first connecting pipe 34 is smaller than the diameter of the first connecting pipe 34.

Figure 7:
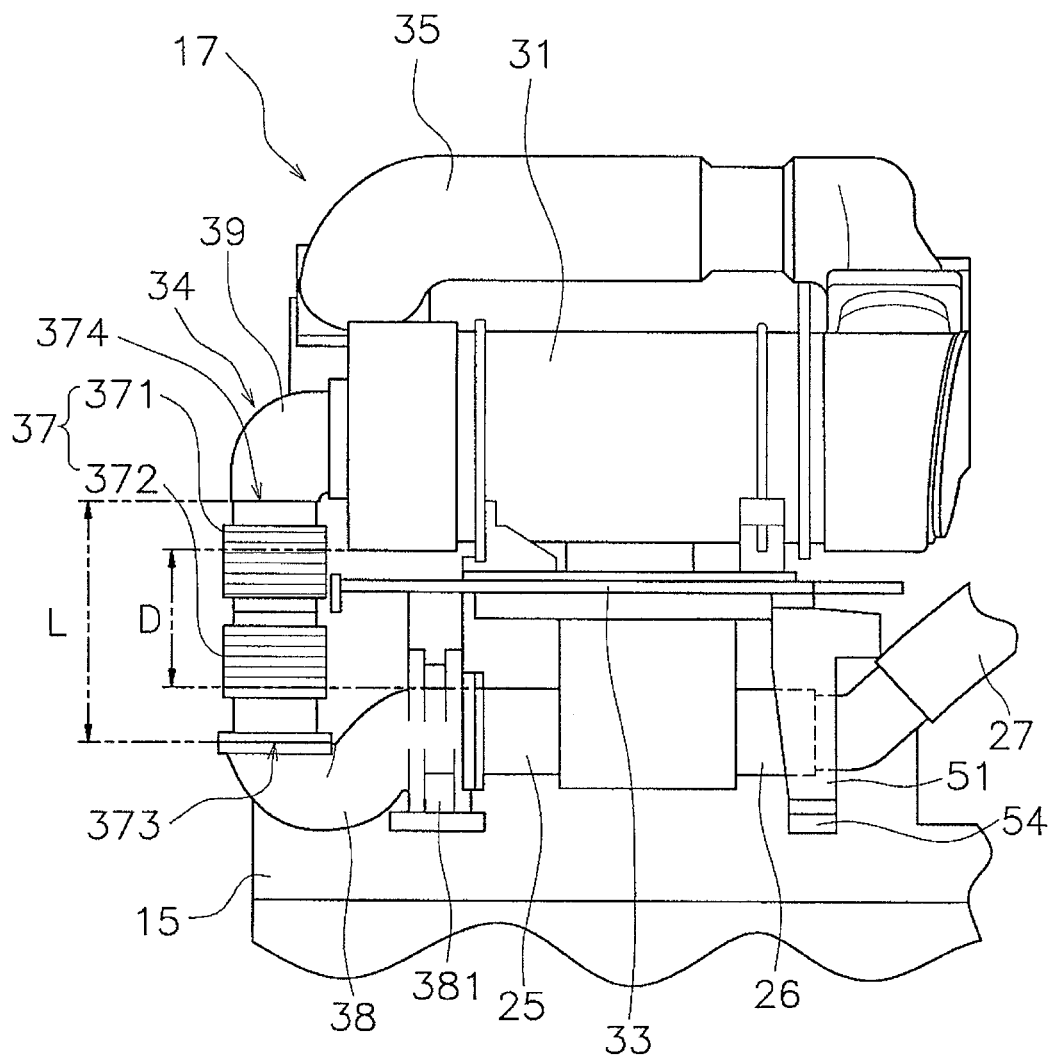
FIG. 7 is an expanded view of a part of FIG. 5.

As shown in FIG. 5, the first connecting pipe 34 has an expandable-contractible bellows portion 37. The bellows portion 37 has a linear form following the upward-downward direction. Note that in this embodiment, the bellows portion 37 includes not only the bellows shaped portion, but also the connecting end portion that forms an integrated body with the bellows shaped portion. The lower end portion 373 of the bellows portion 37 is positioned below the upper end portion of the exhaust gas opening 25. The upper end portion 374 of the bellows portion 37 is positioned above the upper face of the bracket 33. The upper end portion 374 of the bellows portion 37 is positioned above the lower end portion of the first exhaust gas treatment device 31. As shown in FIG. 7, the length L of the bellows portion 37 is longer than the distance D in the upward-downward direction, between the upper end portion of the exhaust gas opening 25 and the lower end portion of the first exhaust gas treatment device 31. As shown in FIG. 3, the bellows portion 37 is arranged extending in the upward-downward direction following the wall part 19.

As shown in FIG. 5, the bellows portion 37 has a first bellows tube 371 and a second bellows tube 372. The second bellows tube 372 is a separate body from the first bellows tube 371. The second bellows tube 372 is arranged below the first bellows tube 371. The second bellows tube 372 is connected to the first bellows tube 371.

The first connecting pipe 34 has a first connecting pipe portion 38. The first connecting pipe portion 38 connects the exhaust gas opening 25 and the lower end portion 373 of the bellows portion 37. The first connecting pipe portion 38 has a form curving from the exhaust gas opening 25 to a position below the exhaust gas opening 25. Further, the first connecting pipe portion 38 has a form curving from a position below the exhaust gas opening 25 toward the upward direction.

The first connecting pipe 34 has a second connecting pipe portion 39. The first exhaust gas treatment device 31 has a cylindrical portion 313 and an end face 311. The end face 311 closes the end portion of the cylindrical portion 313 in the axial direction of the first exhaust gas treatment device 31. The end face 311 is the rear face of the first exhaust gas treatment device 31. The second connecting pipe portion 39 connects the end face 311 of the first exhaust gas treatment device 31 and the upper end portion 374 of the bellows portion 37. The second connecting pipe portion 39 attaches directly to the end face 311 of the first exhaust gas treatment device 31. The second connecting pipe portion 39 has a form curving downward from the end face 311.

The engine unit 10 has a second connecting pipe 35. The second connecting pipe 35 connects the first exhaust gas treatment device 31 and the second exhaust gas treatment device 32. As shown in FIG. 2 and FIG. 6, the second connecting pipe 35 is positioned above the space between the first exhaust gas treatment device 31 and the second exhaust gas treatment device 32.

Specifically, the first exhaust gas treatment device 31 has a first connection opening 312. The first connection opening 312 projects upward moreover toward the second exhaust gas treatment device 32 side. The first connection opening 312 is provided in the front portion of the peripheral surface of the first exhaust gas treatment device 31. The second connecting pipe 35 is connected to the first connection opening 312.

The second exhaust gas treatment device 32 has a second connection opening 321. The second connection opening 321 is provided in the rear portion of the peripheral surface of the second exhaust gas treatment device 32. The second connection opening 321 is positioned behind the first connection opening 312. The second connection opening 321 projects upward moreover toward the first exhaust gas treatment device 31 side. The second connecting pipe 35 is connected to the second connection opening 321.

The second exhaust gas treatment device 32 has a third connection opening 322. The third connection opening 322 is provided in the front portion of the peripheral surface of the second exhaust gas treatment device 32. The third connection opening 322 is positioned forward the second connection opening 321. The third connection opening 322 is positioned lateral to the first connection opening 312. The third connection opening 322 projects upward moreover toward the direction outward from the first exhaust gas treatment device 31.

As shown in FIG. 3, the engine unit 10 has a third connecting pipe 36. The third connecting pipe 36 is connected to the third connection opening 322. The upper part of the third connecting pipe 36 projects upward from the upper face 13 of the engine room 8. The exhaust gas outlet pipe 8a described above, is connected to the third connecting pipe 36.

The engine 15, the first connecting pipe 34, the first exhaust gas treatment device 31, the second connecting pipe 35, the second exhaust gas treatment device 32, and the third connecting pipe 36 are connected in that order in series. Accordingly, exhaust gas from the engine 15 passes through the first connecting pipe 34 and is delivered to the first exhaust gas treatment device 31. At the first exhaust gas treatment device 31, mainly particulate matter, is decreased in the exhaust gas. Next, the exhaust gas passes through the second connecting pipe 35 and is delivered to the second exhaust gas treatment device 32. At the second exhaust gas treatment device 32 mainly NOx, is decreased in the exhaust gas. Thereafter, the purified exhaust gas passes through the third connecting pipe 36 and the exhaust gas outlet pipe 8a and is expelled to the outside.

Figure 8:
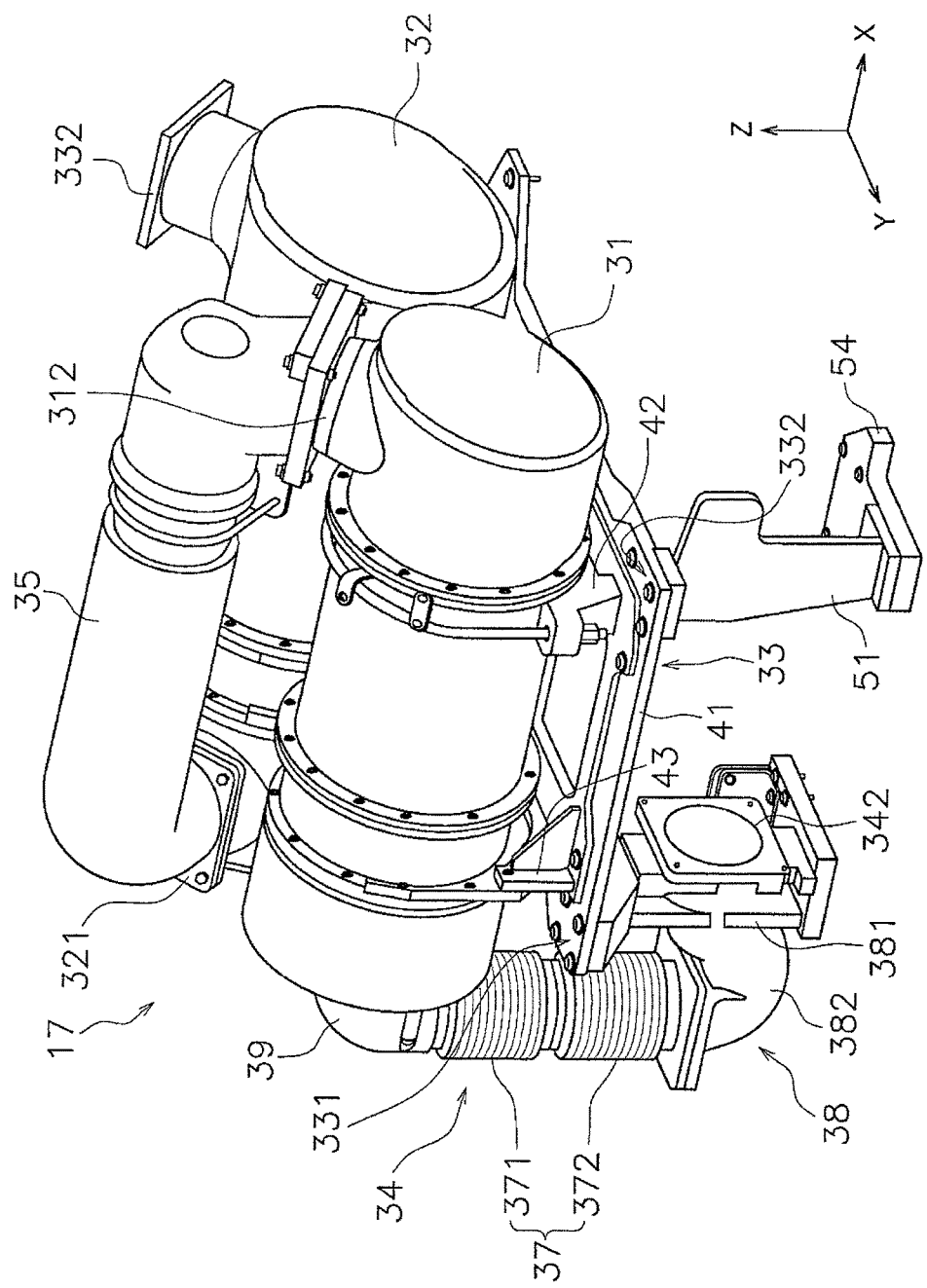
FIG. 8 is a perspective view of the exhaust gas treatment unit of the working vehicle.
Figure 9:
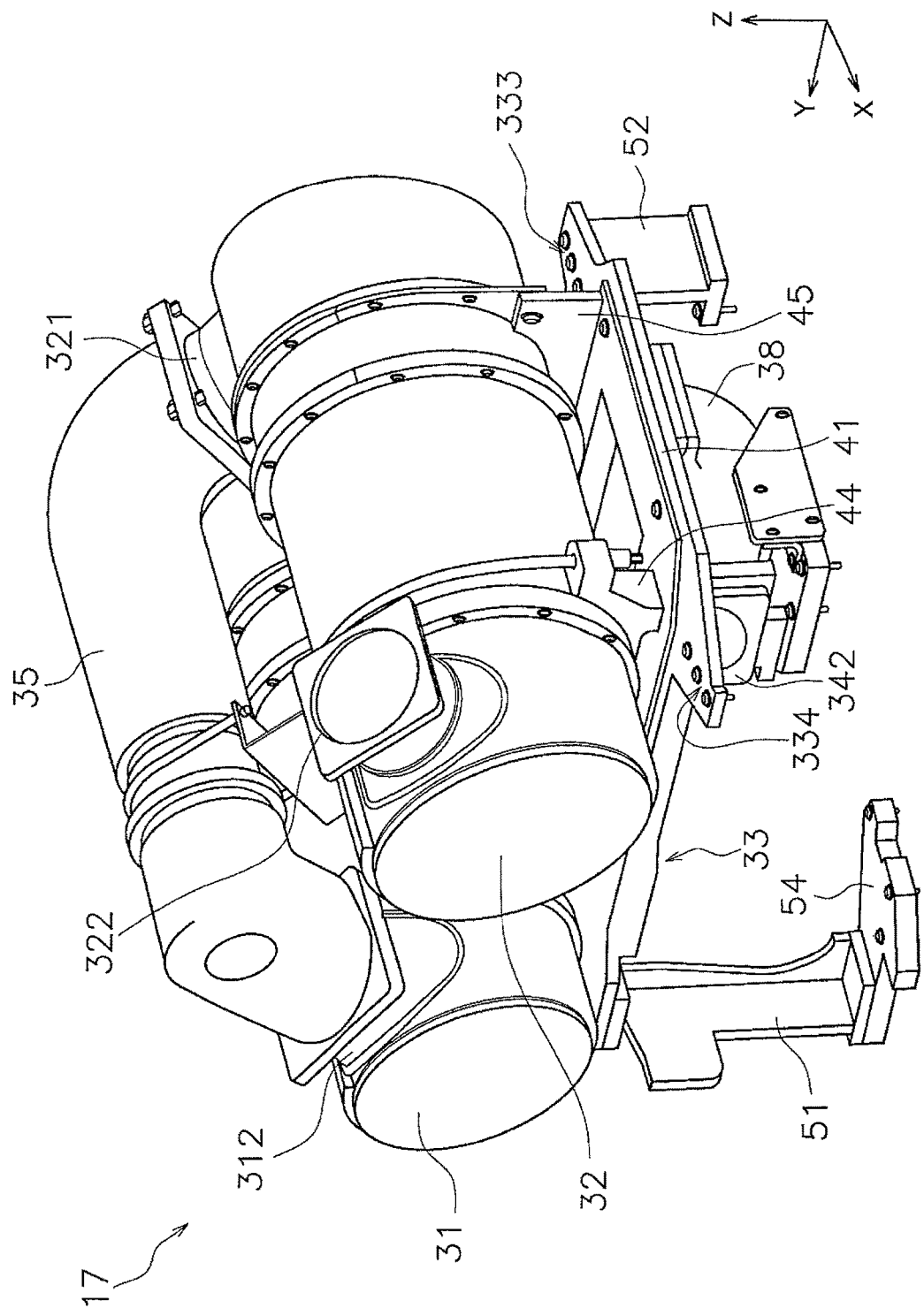
FIG. 9 is a perspective view of the exhaust gas treatment unit of the working vehicle.

FIG. 8 and FIG. 9 provide perspective views of the exhaust gas treatment unit 17. Specifically, FIG. 8 shows the exhaust gas treatment unit 17 viewed from the right oblique front. FIG. 9 shows the exhaust gas treatment unit 17 viewed from the left oblique front.

As described above, the exhaust gas treatment unit 17 has a bracket 33. As shown in FIG. 8 the bracket 33 has a plate part 41, a first mounting part 42 and a second mounting part 43. The plate part 41 is of substantially rectangular form. The first mounting part 42 and the second mounting part 43 are arranged on the plate part 41. The upper face of the first mounting part 42 has a curved recess shape the curvature of which follows the bottom of the first exhaust gas treatment device 31. The upper face of the second mounting part 43 has a curved recess shape the curvature of which follows the bottom of the first exhaust gas treatment device 31. The first mounting part 42 and the second mounting part 43 are arranged side-by-side following the lengthwise direction of the first exhaust gas treatment device 31. The first exhaust gas treatment device 31 is mounted in place on the first mounting part 42 and the second mounting part 43 and is attached to the first mounting part 42 and the second mounting part 43.

As shown in FIG. 9, the bracket 33 has a third mounting part 44 and a fourth mounting part 45. The third mounting part 44 and the fourth mounting part 45 are arranged on the plate part 41. The upper face of the third mounting part 44 has a curved recess shape the curvature of which follows the bottom of the second exhaust gas treatment device 32. The upper face of the fourth mounting part 45 has a curved recess shape the curvature of which follows the bottom of the second exhaust gas treatment device 32. The third mounting part 44 and the fourth mounting part 45 are arranged side-by-side following the lengthwise direction of the second exhaust gas treatment device 32. The second exhaust gas treatment device 32 is mounted in place on the third mounting part 44 and the fourth mounting part 45 and is attached to the third mounting part 44 and the fourth mounting part 45.

As shown in FIG. 8 and FIG. 9 the exhaust gas treatment unit 17 has a plurality of supporting members 38, 51 and 52. The plurality of supporting members 38, 51 and 52 support the bracket 33. Among these supporting members 38, 51 and 52, the supporting member 38 has the first connecting pipe portion 38. That is to say, the first connecting pipe portion 38 also functions as the first supporting member for supporting the bracket 33 of the exhaust gas treatment unit 17. As shown in FIG. 8, the first connecting pipe portion 38 is arranged below the first exhaust gas treatment device 31. The bracket 33 has a first fixed part 331. The first connecting pipe portion 38 is secured to the first fixed part 331.

Figure 10:
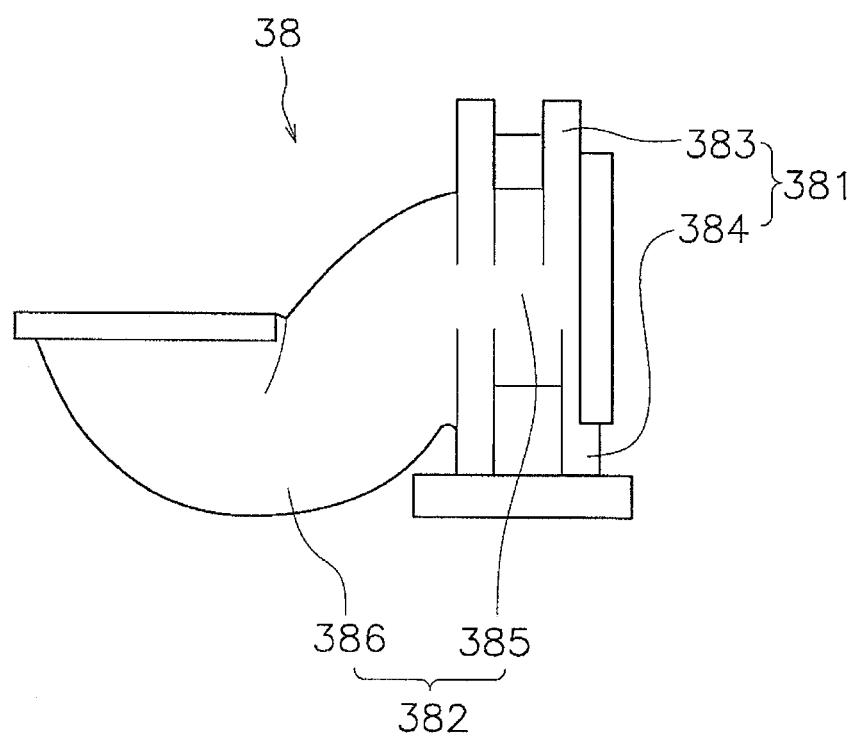
FIG. 10 is a right side view of the first connecting pipe portion.

FIG. 10 is a right side view of the first connecting pipe portion 38. As shown in FIG. 10, the first connecting pipe portion 38 is an integratedly formed single part. However, it is also suitable for the first connecting pipe portion 38 to be configured as a combination of a plurality of parts. The first connecting pipe portion 38 includes a supporting portion 381 and a pipe portion 382. The supporting portion 381 is positioned below the bracket 33. The supporting portion 381 includes an upper support portion 383 and a lower support portion 384. The upper support portion 383 extends upward from the pipe portion 382. The lower support portion 384 extends downward from the pipe portion 382. As shown in FIG. 8 the supporting portion 381 supports the bracket 33. The supporting portion 381 supports the corner of the bracket 33. In this embodiment of the present invention, the first fixed part 331 is disposed at the right rear corner of the bracket 33. Accordingly, the supporting portion 381 supports the right rear corner of the bracket 33.

The pipe portion 382 is integrated with the supporting portion 381. The pipe portion 382 is disposed so as to pass through the supporting portion 381. The pipe portion 382 is arranged below the bracket 33. The pipe portion 382 is arranged extending in the forward-backward direction. The bellows portion 37 described above, is, along the path of the exhaust gas, disposed between the pipe portion 382 and the first exhaust gas treatment device 31.

The pipe portion 382 has a first pipe portion 385 and a second pipe portion 386. The first pipe portion 385 is positioned between the upper support portion 383 and the lower support portion 384. The first pipe portion 385 connects to the exhaust gas opening 25 described above. The second pipe portion 386 is linked to the first pipe portion 385. The second pipe portion 386 has a form curving from the first pipe portion 385 toward a position below the exhaust gas opening 25. Further, the second pipe portion 386 has a form curving from the position below the exhaust gas opening 25 toward the upward direction. The second pipe portion 386 is connected to the lower end portion 373 of the bellows portion 37 described above.

As shown in FIG. 8, among the plurality of supporting members 38, 51 and 52 is a second supporting member 51. The second supporting member 51 is arranged forward the first connecting pipe portion 38. The second supporting member 51 is arranged below the first exhaust gas treatment device 31. The bracket 33 has a second fixed part 332. The second supporting member 51 is secured to the second fixed part 332. The second fixed part 332 is positioned forward the first fixed part 331. The second supporting member 51 supports a corner of the bracket 33. In this embodiment of the present invention, the second fixed part 332 is disposed at the right front corner of the bracket 33. Accordingly, the second supporting member 51 supports the right front corner of the bracket 33. As shown in FIG. 6, the second supporting member 51 is positioned further to the outside than the first connecting pipe portion 38. As shown in FIG. 5, the air suction opening 26 is arranged to the inner side from the 51. In this embodiment, the second supporting member 51 is positioned further to the right than the first connecting pipe portion 38. The air suction opening 26 is arranged to the left of the second supporting member 51.

As shown in FIG. 6 and FIG. 8, the first connecting pipe portion 38 is secured to the engine 15 via a first fixed bracket 53. The second supporting member 51 is secured to the engine 15 via a second fixed bracket 54.

As shown in FIG. 9, among the plurality of supporting members 38, 51 and 52, the third supporting member 52 is arranged below the second exhaust gas treatment device 32. The bracket 33 has a third fixed part 333. The third supporting member 52 is secured to the third fixed part 333. The third supporting member 52 supports a corner of the bracket 33. In this embodiment, the third fixed part 333 is disposed at the left rear corner of the bracket 33. Accordingly, the third supporting member 52 supports the left rear corner of the bracket 33.

The bracket 33 has a fourth fixed part 334. The fourth fixed part 334 is positioned forward the third fixed part 333. In this embodiment, the fourth fixed part 334 is disposed at the left front corner of the bracket 33. As shown in FIG. 6, the third supporting member 52 is secured to the engine 15 via a third fixed bracket 55. As shown in FIG. 3, the fourth fixed part 334 is secured to the engine 15 via the fourth fixed bracket 56.

The working vehicle 1 and exhaust gas treatment unit 17 according to this embodiment of the present invention furnish the following characteristics.

In the exhaust gas treatment unit 17, the first exhaust gas treatment device 31 can be firmly supported by the supporting portion 381. Further, the first connecting pipe 34 includes the supporting portion 381. Specifically, the first connecting pipe portion 38 includes the supporting portion 381. That is to say, the first connecting pipe portion 38 is also used as a part for supporting the first exhaust gas treatment device 31. In other words, the first supporting member includes the pipe portion 382. That is to say, the first supporting member is also used as a part for directing exhaust gas. For this reason, the route of the first connecting pipe 34 can be simplified. Moreover, as the pipe portion 382 is integrated with the supporting portion 381, the number of parts can be reduced.

The pipe portion 382 is disposed so as to pass through the supporting portion 381. For this reason, the route of the first connecting pipe 34 can be further simplified. Again, the pipe portion 382 can be compactly arranged together with the supporting portion 381.

The supporting portion 381 includes the upper support portion 383 extending upward from the pipe portion 382. For this reason, the first exhaust gas treatment device 31 can be supported by the upper support portion 383 and the pipe portion 382.

The supporting portion 381 includes the lower support portion 384 extending downward from the pipe portion 382. For this reason, the first exhaust gas treatment device 31 can be supported by the lower support portion 384 and the pipe portion 382.

The supporting portion 381 and the pipe portion 382 are positioned below the bracket 33. In this configuration, the supporting portion 381 and the pipe portion 382 can support the bracket 33 from below.

The first end portion 341 of the first connecting pipe 34 is connected to the first exhaust gas treatment device 31. The second end portion 342 of the first connecting pipe 34 is the end at the opposite side to the first end portion 341. The first end portion 341 and the second end portion 342 are positioned in the same perpendicular plane. For this reason, the length of the route of the first connecting pipe 34 can be shortened.

The bracket 33 is rectangular. The supporting portion 381 supports a corner of the bracket 33. In this configuration the first connecting pipe 34 can be arranged so as to pass below the corner of the bracket 33, and the route of the first connecting pipe 34 can be simplified.

The first connecting pipe 34 further provides the bellows portion 37. The bellows portion 37 is arranged between the pipe portion 382 and the first exhaust gas treatment device 31. The bellows portion 37 is expandable-contractible. In this configuration, adjustment of the position of the pipe portion 382 and the supporting portion 381 in relation to the first exhaust gas treatment device 31 can be performed easily. Accordingly, it becomes easy to connect the first connecting pipe 34 to the first exhaust gas treatment device 31.

Although the invention has been described by reference to an embodiment thereof, the invention is not limited to the embodiment described above. It is therefore understood that numerous modifications and variations can be devised without departing from the scope of the invention.

In the above-described embodiment, a bulldozer was provided as an example of a working vehicle. The present invention is not restricted to a bulldozer however, and may be applied to another working vehicle such as a wheel loader or a hydraulic shovel or the like.

The configuration of the exhaust gas treatment unit 17 is not restricted to that as described above. For example, it is suitable for the first exhaust gas treatment device 31 to be a treatment device other than a diesel particulate matter collection filter device. It is suitable for the second exhaust gas treatment device 32 to be a treatment device other than a selective reducing catalytic device. It is suitable for the first exhaust gas treatment device 31 and the second exhaust gas treatment device 32 to be arranged in positions other than the above described positions. The first exhaust gas treatment device 31 is not limited to being of cylindrical form or the like, and it is suitable for the first exhaust gas treatment device 31 to be of another form such as elliptically cylindrical or cuboid. The second exhaust gas treatment device 32 is not limited to being of cylindrical form or the like, and it is suitable for the second exhaust gas treatment device 32 to be of another form such as elliptically cylindrical or cuboid. Again, it is suitable for the first through third connecting pipes 34, 35, and 36 to be arranged in positions different to those as described above.

It is suitable for the layout of the engine room 8 to be opposite in the lateral direction, to the layout described above. For example, it is suitable for the first exhaust gas treatment device 31 to be arranged to the left side and for the second exhaust gas treatment device 32 to be arranged to the right side. It is suitable for the first side portion 161 of the air cleaner 16 to be arranged to the right side and for the second side portion 162 to be arranged to the left side.

In the first connecting pipe portion 38, it is suitable for the upper support portion 383 or the lower support portion 384 to be omitted. The supporting portion 381 is not restricted to being directly below the bracket 33, and it is suitable for the supporting portion 381 to be positioned in any direction forward or backward, leftward or rightward, from the position directly below the bracket 33. It is suitable for the supporting portion 381 to support a part other than a corner of the bracket 33. It is suitable for the bellows portion 37 to be omitted.

INDUSTRIAL APPLICABILITY

According to the present invention, an exhaust gas treatment unit is provided that enables an exhaust gas treatment device to be firmly supported and enables the route of a connecting pipe to be simplified.

The invention claimed is:

1. An engine unit comprising:
an engine having an exhaust gas opening;
an exhaust gas treatment device disposed above the exhaust gas opening of the engine;
a bracket with the exhaust gas treatment device mounted thereon; and
a connecting pipe connected to the exhaust gas opening, the connecting pipe being configured to direct exhaust gas to the exhaust gas treatment device, the connecting pipe including a supporting portion supporting the bracket, the supporting portion including an upper support portion and a lower support portion, and a pipe portion integrated with the supporting portion, the pipe portion including a first pipe portion formed passing through the supporting portion between the upper support portion and the lower support portion, the upper support portion extending upward from the pipe portion and the lower support portion extending downward from the pipe portion, the supporting portion and the pipe portion being positioned below the bracket, and the bracket being attached to the engine via the supporting portion; wherein
the pipe portion further includes a second pipe portion configured to curve downward from the first pipe portion toward a position below the first pipe portion, and to curve upward from the position below the first pipe portion in a direction away from the first pipe portion.

2. The engine unit according to claim 1, wherein the supporting portion includes an upper supporting portion extending upward from the pipe portion.

3. The engine unit according to claim 1, wherein the supporting portion includes a lower supporting portion extending downward from the pipe portion.

4. The engine unit according to claim 1, wherein the connecting pipe includes a first end portion connected to the exhaust gas treatment device, and a second end portion on an opposite side relative to the first end portion, and
the first end portion and the second end portion are positioned in a common perpendicular plane perpendicular to a horizontal plane.

5. The engine unit according to claim 1, wherein the bracket is rectangular, and the supporting portion supports a corner of the bracket.

6. The engine unit according to claim 1, wherein the connecting pipe includes an expandable-contractible bellows portion arranged between the pipe portion and the exhaust gas treatment device.

7. A working vehicle including the engine unit according to claim 1.

8. The engine unit according to claim 1, wherein the supporting portion and the pipe portion are integrally formed as a single part.

9. An engine unit comprising:
an engine having an exhaust gas opening;
an exhaust gas treatment device disposed above the exhaust gas opening of the engine;
a bracket with the exhaust gas treatment device mounted thereon; a supporting member supporting the bracket; and
a connecting pipe connected to the exhaust gas opening, the connecting pipe being configured to direct exhaust gas to the exhaust gas treatment device, the supporting member including a supporting portion supporting the bracket, the supporting portion including an upper support portion and a lower support portion, and a pipe portion integrated with the supporting portion, the pipe portion being connected to the connecting pipe, the pipe portion including a first pipe portion formed passing through the supporting portion between the upper support portion and the lower support portion, the upper support portion extending upward from the pipe portion and the lower support portion extending downward from the pipe portion, the supporting portion and the pipe portion being positioned below the bracket, and the bracket being attached to the engine via the supporting portion; wherein
the pipe portion further includes a second pipe portion configured to curve downward from the first pipe portion toward a position below the first pipe portion, and to curve upward from the position below the first pipe portion in a direction away from the first pipe portion.

10. The engine unit according to claim 9, wherein the supporting portion includes an upper supporting portion extending upward from the pipe portion.

11. The engine unit according to claim 9, wherein the supporting portion includes a lower supporting portion extending downward from the pipe portion.

12. The engine unit according to claim 9, wherein the connecting pipe includes a first end portion connected to the exhaust gas treatment device,
the pipe portion includes a second end portion positioned on an opposite side relative to a connecting portion of the connecting pipe, and
the first end portion and the second end portion are positioned in a common perpendicular plane perpendicular to a horizontal plane.

13. The engine unit according to claim 9, wherein the bracket is rectangular, and the supporting portion supports a corner of the bracket.

14. The engine unit according to claim 9, wherein the connecting pipe includes an expandable-contractible bellows portion arranged between the pipe portion and the exhaust gas treatment device.

15. A working vehicle including the engine unit according to claim 9.

16. The engine unit according to claim 9, wherein the supporting portion and the pipe portion are integrally formed as a single part.

* * * * *